United States Patent Office 2,741,240
Patented Apr. 10, 1956

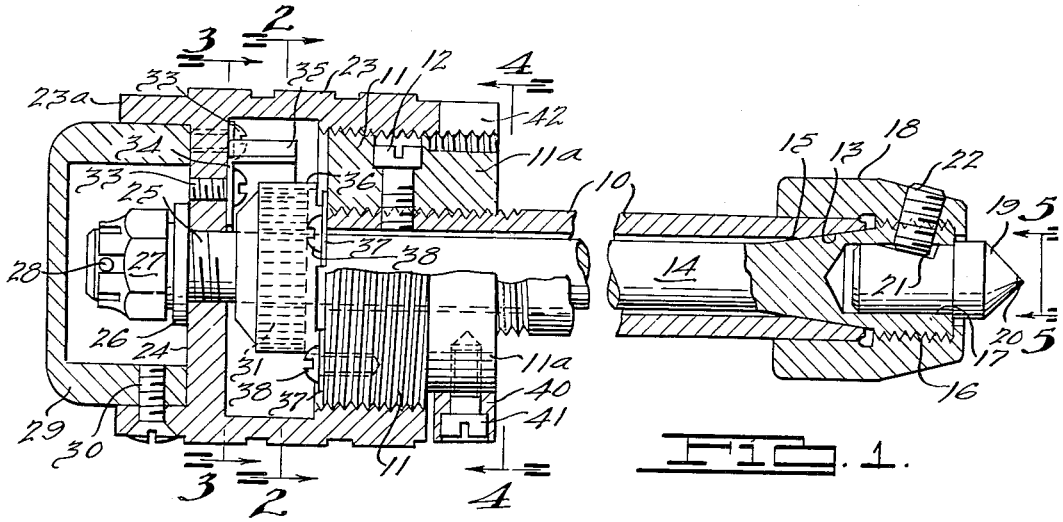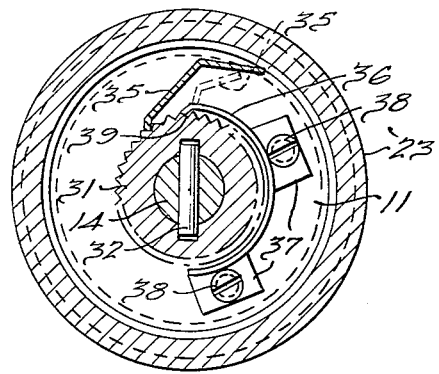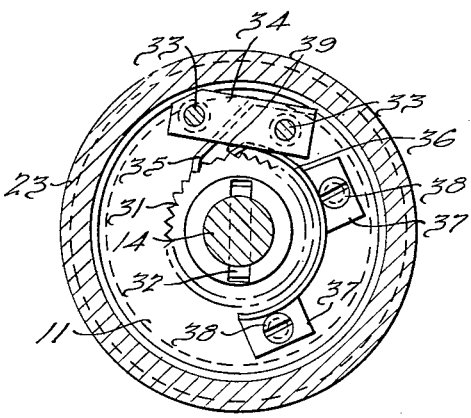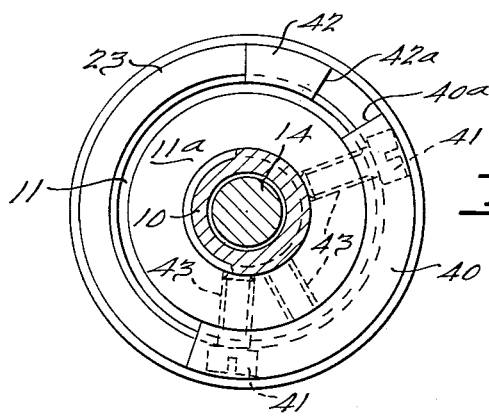

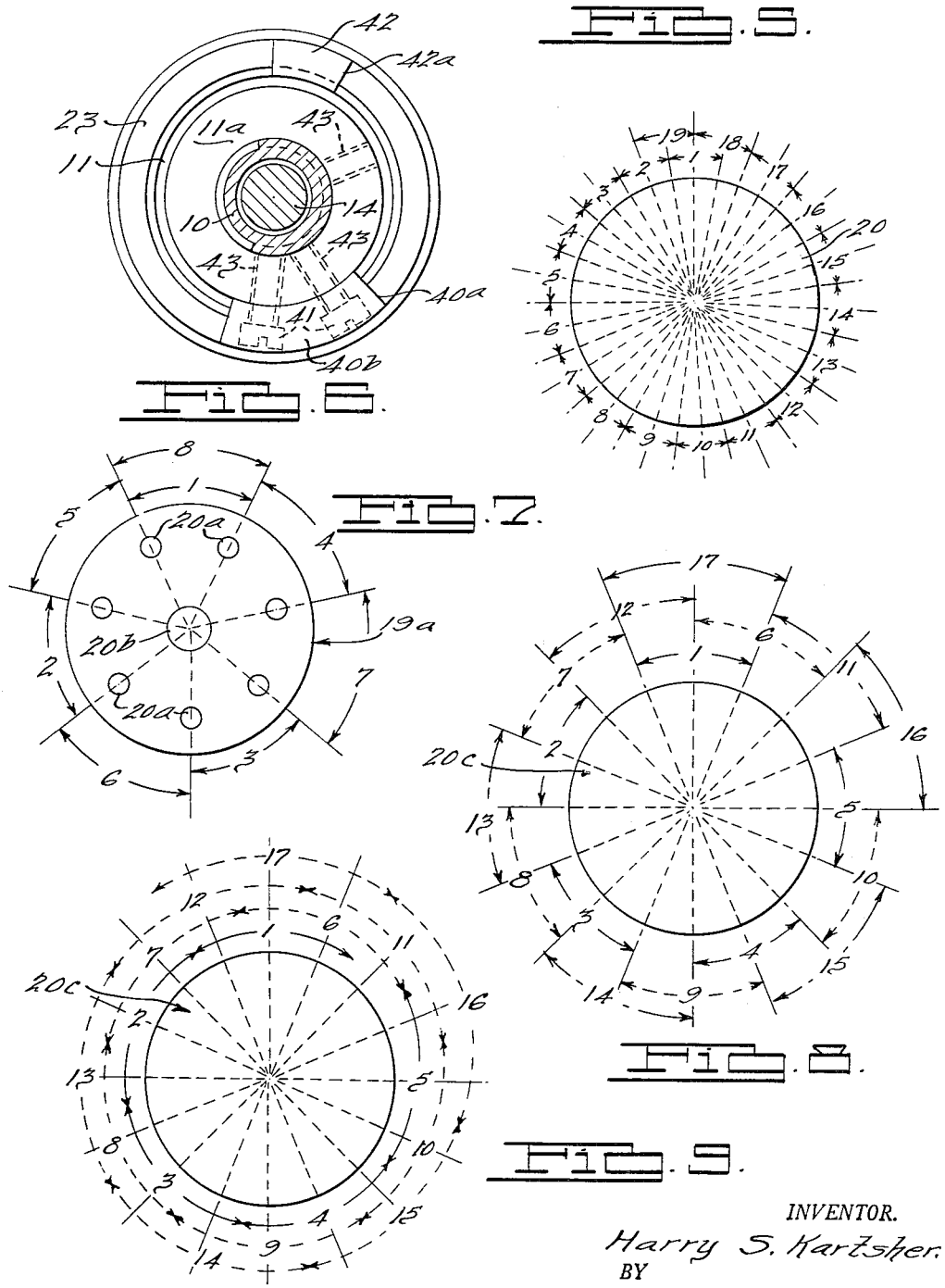

2,741,240

DRESSING TOOL AND METHOD

Harry S. Kartsher, University Heights, Ohio, assignor to Koebel Diamond Tool Co., Detroit, Mich., a corporation of Michigan Application January 12, 1951, Serial No. 205,619

9 Claims. (Cl. 125—11)

This invention relates to an apparatus for holding and indexing a diamond dressing tool of either the single or multiple diamond type, and to an improved method of indexing the tool with respect to the work to be dressed.

In the ordinary use of a diamond dressing tool, as for example to dress a rotating abrasive wheel, the tool is customarily mounted in a suitable carriage designed to hold the diamond firmly and at a proper angle against the working face of the wheel. After repeated dressing operations, the dressing edge of the diamond is worn to a dull "flat" which fails to remove stock from the wheel efficiently and tends to generate excessive heat, causing the diamond to crack and disintegrate. Accordingly when the diamond's dressing edge has worn to an objectionable flat area, the tool is generally indexed by a partial rotation to bring a sharp diamond edge into operation. After a number of successive indexing operations, the tool will complete a full rotation and the initial flat area will again be exposed at the dressing position.

It is accordingly an important object of the present invention to provide an improved indexing pattern whereby either a single or multiple diamond dressing tool is successively indexed by increments of rotary motion throughout the entire useful life of the diamond employed so as to expose an edge of substantially uniform sharpness at the dressing position after each indexing movement.

Another object is to provide an improved economically manufactured apparatus for holding a diamond dressing tool, which is simple and efficient in operation and which is readily adaptable for indexing the tool in accordance with substantially any desired rotary indexing pattern.

Another object is to provide such an apparatus comprising a rotatable dressing tool holder and a body member, one sleeved within the other and the holder being axially movable to and from locking engagement with the body, whereat the holder is held in an operative condition against rotation relative to the body. A rotatable operator also movable axially of the body by screw engagement therewith is engageable with the holder to move the latter axially into said locking engagement upon rotation of the operator in a locking direction, or to release the holder from said locking engagement upon opposite rotation of the operator in an indexing direction. Operatively connecting the operator and holder are indexing means including elements carried by the operator and holder and engageable to rotate the latter in an indexing movement upon rotation of the operator in said indexing direction, the operator being rotatable in the opposite or locking direction independently of the holder. Means are also provided to hold the indexing elements out of operative engagement until after the operator has rotated in said indexing direction sufficiently to release the holder from locking engagement with the body. Thus indexing movement of the holder will not be urged until it is released for rotational movement.

In a preferred construction, the tool holder is a shaft sleeved within a generally tubular body member, the holder and body having integral tapered seating portions relatively movable axially to and from frictional locking seating engagement. The operator comprises an internally threaded sleeve screwed on the body and is adapted to abut and move the holder to said frictional locking engagement upon the aforesaid rotation of the sleeve in the locking direction. Upon rotation of the operator sleeve in the opposite or indexing direction, indexing rotation is imparted to the holder by means of a spring pressed pawl carried by the operator and engaging a toothed ratchet wheel keyed to the holder. In this regard, a guard having a spring detent engaged with the ratchet wheel to prevent return movement thereof upon rotation of the operator in the locking direction extends partially around the ratchet wheel. The pawl rides on the guard during the initial indexing rotation of the operator and is thus held out of engagement with the ratchet wheel until the frictional locking engagement between the holder and body is released, whereupon the pawl rides off the guard to engage and drive the ratchet wheel through the desired indexing movement. The latter is determined by suitable movement limiting means. Upon return rotation of the operator in the locking direction, the pawl will ride over the ratchet teeth to the guard and thence ride along the latter out of engagement with the ratchet teeth until the aforesaid locking engagement between the holder and body prevents further rotation. It is apparent from the foregoing that both indexing and clamping operations are accomplished by a two-way rotary movement of the single sleeve operator.

Other objects are to provide an apparatus of the foregoing character wherein the aforesaid engagement between the operator and holder, which moves the latter into locking engagement with the body, is readily and simply adjustable to compensate for wear between the parts involved; and to provide such an apparatus wherein substantially any desired rotary indexing movement of the tool holder may be readily accomplished by suitably adjusting the movement limiting means, as for example by means of a removable portion thereof replaceable by a similar portion of different size.

Other objects of this invention will appear in the following description and appended claims, reference being had to the accompanying drawings forming a part of this specification wherein like reference characters designate corresponding parts in the several views.

Fig. 1 is a fragmentary longitudinal section through a dressing tool holder and indexing device embodying the present invention.

Fig. 2 is a sectional view taken in the direction of the arrows substantially along the line 2—2 of Fig. 1, but showing the indexing pawl at the end of an indexing movement, the pawl being shown in phantom in the operative or dressing position.

Fig. 3 is a sectional view taken in the direction of the arrows substantially along the line 3—3 of Fig. 1, also showing the pawl at the end of the indexing position.

Fig. 4 is a sectional view taken in the direction of the arrows substantially along the line 4—4 of Fig. 1, showing the stops for the indexing movement in position as at the beginning of indexing movement of the dressing tool holder.

Fig. 5 is an enlarged somewhat schematic end view of the apex of the dressing diamond, taken in the direction of the arrows along the line 5—5 of Fig. 1.

Fig. 6 is a view similar to Fig. 4, showing a modified indexing stop.

Fig. 7 is an end view from the diamond end of a multiple diamond dressing tool suitable for use with the stop shown in Fig. 6.

Figs. 8 and 9 are enlarged somewhat schematic end views from the diamond end of a dressing tool showing two different indexing patterns illustrating the present invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, one embodiment and application of the present invention are illustrated by way of example in Figs. 1 through 5, wherein a two piece body is shown comprising a cylindrical tube 10 externally threaded at one end and an annular internally and externally threaded member 11 screwed on the threaded end of the tube 10 and positively keyed thereto by a plurality of countersunk radial screws 12. The bore of the tube 10 enlarges conically endwise at the other end to provide a tapered seat 13. Mounted coaxially within the tube 10 and extending from opposite ends thereof is a tool holding shaft 14 having a tapered seating portion 15 mating with the seat 13 and adapted to seat frictionally thereagainst in a locking action. Endwise of the seating portion 15, the shaft 14 terminates in an externally threaded end 16 having an endwise opening socket 17 therein and an annular cover 18 screwed thereon. The socket 17 is dimensioned to receive a dressing tool insert 19, which may be of conventional construction comprising one or more dressing diamonds, a single conical diamond tip 20 being shown in the present instance. The tool 19 is notched at 21 and is retained in the socket 17 by means of a set screw 22 extending generally radially through the cover 18 and shaft 14 into the socket 17.

Mounted on the body portion 11 and engaged with the external threads thereof, which in the present instance are left handed, is an internally threaded sleeve or operator 23 closed at its outer end by a heavy diaphragm 24 through which a threaded extension 25 of the shaft 14 extends. Located endwise of the diaphragm 24 are a thrust washer 26 and castellated adjusting nut 27 on the extension 25, the nut 27 being retained in adjusted position on the shaft 14 by a pin 28. The adjusting nut 27 is enclosed within a cup-like cover 29 having its annular edges terminating adjacent the diaphragm 24 and confined within an endwise flange portion 23a of the sleeve 23, as for example by one or more screws 30.

By virtue of the left hand screw engagement between the sleeve 23 and body member 11, clockwise rotation of the former, Figs. 2 and 3, will tend to back the same off the body 11, driving the diaphragm 24 against the washer 26 and thereby moving the shaft 14 axially from right to left, Fig. 1. As a result, the tapered seating portion 15 will be seated firmly against the correspondingly tapered seat 13, frictionally locking the shaft 14 and tubular member 10 rigidly together as an operating unit for application in a dressing operation. In such application, the body 10, 11 is customarily mounted on a suitable carriage with a sharp dressing edge of the diamond 20 engaging the abrasive wheel, or other work member to be dressed, at a desired fixed angle. The diamond 20 is then moved across the working face of the wheel at said fixed angle until the dressing edge is worn to a flat surface of predetermined area. The diamond 20 is then indexed to a new position, so as to bring a sharp dressing edge into operation.

In order to simplify such indexing procedure without changing the angular relationship of the body 10, 11 with respect to the work member, suitable means are provided for rotating the shaft 14 a predetermined distance upon rotation of the sleeve 23 in a counterclockwise indexing movement, Figs. 2 and 3. In the embodiment shown by way of example, such means include a ratchet or toothed wheel 31 having a desired number of teeth, 35 in the present instance. The wheel 31 is slidably keyed and held against rotation on the shaft 14 intermediate the body portion 11 and diaphragm 24 by a pin 32, Fig. 2, and is thus readily replaceable, if desired, by a ratchet having a different number of teeth, as discussed below. Mounted on the diaphragm 24 by means of screws 33, Fig. 3, is a bracket 34 having an integral spring arm or indexing pawl 35. The latter terminates in a ratchet driving tip extending angularly and generally counterclockwise toward the wheel 31 and is yieldingly urged into spring pressed driving engagement with the teeth thereof.

In the operating condition of the apparatus shown, i. e. with the shaft 14 and member 10 frictionally locked together, the pawl 35 rests at the position indicated in phantom, Fig. 2. In order to hold the pawl 35 out of engagement with the ratchet teeth until the seated portions of the members 10 and 14 are released from frictional locking engagement with each other, a guard 36 extends partially around the wheel 31 in position to hold the pawl 35 therefrom during the initial counterclockwise movement of the sleeve 23. The guard 36 is supported by integral bracket elements 37, which in turn are secured to the body 11 by screws 38, and extends counterclockwise in Figs. 2 and 3 as a spring arm which terminates in a detent finger 39. The latter is yieldingly held in spring pressed engagement with the teeth of the ratchet wheel to prevent its return or clockwise rotation.

By the structure shown, counterclockwise rotation of the sleeve 23 on the body 11, Figs. 2 and 3, will move the pawl 35 counterclockwise along the guard 36 toward the detent end thereof. During this rotation, the sleeve 23 will also move forward on the body 11 by reason of the aforesaid left hand threaded engagement therebetween, releasing the diaphragm from the washer 26 and thereby releasing the frictional binding or locking engagement between the seated portions 13 and 15. The extent of the guard 36 is determined so that when the pawl 35 rides off the detent end thereof and first engages the ratchet wheel 31, the shaft 14 is free to rotate independently of the body 10. Thus upon continued counterclockwise or indexing rotation of the sleeve 23, the pawl 35 will drive the wheel 31 and in turn the shaft 14, thereby indexing the diamond 20 to bring a sharp dressing edge into the position previously occupied by the worn or flat diamond surface. During this movement, the spring guard 36 yields sufficiently to permit passage of the ratchet teeth counterclockwise in Figs. 2 and 3, but return movement of the ratchet wheel 31 and shaft 14 is prevented by the angularly disposed spring pressed detent finger 39.

The limit of the indexing movement is adjustably determined by means of an arcuate replaceable stop 40 secured by a pair of screws 41 to the outer curved surface of an annular unthreaded forward extension 11a of the body 11. The extension 11a projects beyond the forward edge of the sleeve 23, except for a forward extending movement limiting lug 42 of the latter, and is of reduced diameter. The outer surfaces of the curved stop 40 and sleeve 23 have approximately the same radius, so that the confronting edges 40a and 42a of the stop 40 and lug 42 respectively will abut upon clockwise rotation of the sleeve 23, Fig. 4, i. e. counterclockwise in Figs. 2 and 3, to the desired limit of indexing movement. In the present instance, the heads of the screws 41 are countersunk in the outer portions of the stop 40 and their body portions screw into a selected pair of circumferentially spaced tapped holes 43 in the portion 11a. An additional intermediate tapped hole 43 is provided for attachment of a stop comparable to the stop 40, but of different size so as to permit adjustment between the abutting edges corresponding to the edges 40a, 42a, as discussed below. Upon completion of the indexing movement, the sleeve 23 is rotated clockwise in Figs. 2 and 3. The spring pressed pawl 35 will yield sufficiently to ride over the teeth of the ratchet 31 which is held against return rotation by the detent 39. Approximately simultaneously as the pawl 35 engages the guard 36, or shortly thereafter, the diaphragm 24 forces the washer 26 against the nut 27. Thereafter as the pawl rides clockwise over the guard 36, Figs. 2 and 3, the shaft 14 is forced rearward by axial screw driven movement of the diaphragm 24 until further rearward movement is prevented by the frictional locking engagement between the aforesaid seating portions 13, 15. A limited lost motion exists between the washer 26 and nut 27 when the device is at the position shown in Figs. 2 and 3, resulting from the axially forward displacement of the sleeve 23 and diaphragm 24 during the indexing movement.

The spacing between the edges 40a, 42a is determined in the present instance so that upon rotation of the sleeve 23 to the position of Fig. 4, whereat the pawl 35 contacts the first ratchet tooth after riding off the guard 36, an indexing movement of the shaft 14 equal to the spacing of two ratchet teeth or 2/35 of a complete circle is permitted. Referring to Fig. 5, a tool 19 having a generally conical diamond 20, which may be considered to be divided circumferentially into thirty-five equal areas or segments, as indicated by the dotted lines radiating from the apex to the base, is secured in the socket 17 for the dressing operation. After a predetermined number of passes across the work member, the initial dressing area will be worn to a flat subtending an arc equal to two segments, indicated by the arcuate arrows 1. The diamond is then indexed 2/35 of a complete circle, i. e. the arc subtended by two teeth or two segments, so as to substitute at the dressing position the area subtended by the arcuate arrows 2. The dressing operation is continued until a second flat is worn subtending two segments, indicated by the arcuate arrows 2, whereupon the diamond 20 is indexed to bring the next two segments, indicated by the arrows 3, to the dressing position. The indexing and dressing procedure is repeated successively throughout the useful life of the diamond 20. After the seventeenth indexing, the diamond 20 will have been indexed through 34/35 of a complete circle, leaving one segment equal to one-half of an indexing movement that has not been exposed at the dressing position. The flat generated after the eighteenth indexing will overlap the flat generated at the first dressing position by a space equal to one segment. The edge between the flats generated at the first and second positions will be centered at the nineteenth dressing position. Likewise, each 2/35 indexing movement thereafter will bring an edge of the diamond to the dressing position, which edge was generated during the preceding revolution.

Although the foregoing has been illustrated by way of example with a single point diamond, the present invention is flexible for use with multiple diamond tools. Referring to Figs. 6 and 7, a multiple diamond tool 19a is shown having seven diamonds 20a equally spaced about the indexing axis, and a central diamond 20b which may be employed or not as desired. The tool 19a may be considered to comprise seven triangular segments, indicated by the dotted lines through the diamonds 20a, Fig. 7. In this case the indexing stop 40 is replaced by a stop 40b, Fig. 6, similar to the stop 40 but dimensioned to limit the indexing movement to an arc subtended by ten ratchet teeth or 2/7 of a full rotation. The stop 40b is secured to the body 11 by screws 41 utilizing the intermediate screw hole 43.

The tool 19a is employed in the dressing operation substantially as before, but with two adjacent diamonds 20a located at each dressing position which is centered therebetween. Thus the tool 19a is retained at the first dressing position, indicated by the arcuate arrows 1, until the desired flats are worn as determined by a predetermined number of passes across the work member being dressed. Thereafter the tool is indexed 2/7 of a full rotation to the second position, arrow 2, skipping position five which is not indexed to the dressing position until after one full revolution of the tool. By subjecting the diamonds to substantially equal wear at each indexed position, the diamonds will be worn uniformly throughout the useful life of the tool.

It is to be understood that the present invention is not dependent upon a thirty-five toothed ratchet 31, nor to a ratchet having an odd number of teeth. The ratchet 31 may be readily removed and replaced by a similar ratchet having a different number of teeth upon removing the adjusting nut 27. Accordingly any desirable combination of ratchet teeth and indexing movement may be achieved by suitably replacing the ratchet 31 and stop 40.

Fig. 8 by way of example illustrates an application with a ratchet having sixteen or an integral multiple of sixteen teeth and an indexing stop permitting an indexing movement of 3/16 of a rotation. The conical diamond 20c shown may be considered to comprise sixteen equal circumferentially extending segments comparable to the thirty-five segments of Fig. 5. The diamond 20c is worn at the first dressing position to a flat subtending the arc of two segments, arcuate arrows 1. Thereafter the diamond 20c is indexed 3/16 of a revolution to the second position, arcuate arrows 2, and again worn to a flat subtending two segments. The procedure is continued for the useful life of the diamond 20c. It is to be noted that after the sixth indexing, the edge centered at the dressing position will always be one that was generated during the preceding revolution.

Fig. 9 illustrates an application of the diamond 20c wherein each indexing movement is through the arc subtended by three segments and each dressing operation is allowed to continue until a flat is generated also subtending the arc of three segments. In this situation, after the first revolution, the edge formed during the preceding revolution is not centered at the dressing operation. For example, the dressing edge employed during the seventh dressing operation, arcuate arrow 7, and formed by the first and second dressing operations, arcuate arrows 1 and 2 respectively, is spaced from the clockwise edge of the flat to be generated in the seventh dressing operation approximately one-third of the arc subtended by said flat. Similarly, the dressing edge employed in each successive dressing operation is located approximately one-third of the flat to be generated from the clockwise edge thereof and approximately two-thirds from the counterclockwise edge thereof.

It is to be observed that the indexing or dressing pattern illustrated in Fig. 5 is a specific example of the pattern wherein the tool is divided into an odd number of segments (more than three) and indexed an even number of segments to each dressing position. Figs. 8 and 9 are specific examples of the pattern wherein the tool is divided into an even number of segments and indexed an odd number of segments (more than one) to each dressing position. As illustrated in Fig. 8, successive dressing operations need not generate a common edge. It is only necessary that the dressing operation be carried out at each position sufficiently to generate a flat which will be substantially overlapped by a flat generated at a subsequent indexed position of the tool. This situation will result if the arc subtended by the generated flat is substantially greater than a predetermined unit arc and the arc of indexing movement is an aliquant part of a circle, the remainder arc and indexing arc being integral multiples of the unit arc and being prime to each other.

I claim:
1. In the method of utilizing a diamond dressing tool in the dressing of abrasive members, the steps of successively indexing different portions of the dressing surface of said tool in turn to a dressing position by successive rotation of the tool through equal arcs of indexing movement comprising even numbers of units of arc of which an odd number comprise a complete circle, and after each successive indexing of the tool dressing the abrasive members with the portion of the dressing surface of the tool at the dressing position until that portion is worn to a predetermined flat area subtending an arc approximately equal to the arc of the indexing movement.

2. In the method of utilizing a diamond dressing tool in the dressing of abrasive members, the steps of successively indexing different portions of the dressing surface of said tool in turn to a dressing position by successive rotation of the tool through equal arcs of indexing movement, one-half of each arc of indexing movement being an odd submultiple of a complete circle, and after each successive indexing of the tool dressing the abrasive members with the portion of the dressing surface of the tool at the dressing position until that portion is worn to a predetermined flat area subtending an arc approximately equal to the arc of the indexing movement.

3. In a device for dressing abrasive members, a tubular body, a diamond dressing tool holder shiftable within said body, mating tapered seating portions on said body and holder and frictionally engageable to lock said body and holder against relative rotation upon axial shifting of said holder in one axial direction with respect to said body, said body having an externally threaded portion, an internally threaded annular operator screwed on said portion to shift in said one axial direction upon rotation in one rotational direction, a radially projecting abutment on said holder spaced from the tapered seat portion thereof, a radially inward projection on said operator intermediate the tapered seat portion and abutment of said holder and engageable with the latter to shift the holder in said one axial direction upon rotation of said operator in said one rotational direction, an annular ratchet rotatable with said holder and having an odd number of teeth, a pawl rotatable with said operator and engageable with the teeth of said ratchet to index the same upon indexing rotation of said operator in an indexing direction oppositely to said one rotational direction, said pawl being initially engageable with a tooth of said ratchet at one rotational position with respect to said body upon rotation of said operator in said indexing direction, and a pair of blocking members on said operator and body respectively, said blocking members being engageable to limit indexing rotation of said operator to a predetermined arc of movement in said indexing direction and being spaced arcuately by an arc equal to an arc of said annular ratchet containing a predetermined even number of teeth when said pawl is at said one rotational position.

4. In a device for dressing abrasive members, a tubular body, a diamond dressing tool holder shiftable within said body, mating tapered seating portions on said body and holder and frictionally engageable to lock said body and holder against relative rotation upon axial shifting of said holder in one axial direction with respect to said body, said body having an externally threaded portion, an internally threaded annular operator screwed on said portion to shift in said one axial direction upon rotation in one rotational direction, said holder having a portion abutting a portion of said operator at the axial side of the latter portion facing in said one axial direction, thereby to be shifted in said one axial direction by said latter portion upon rotation of said operator in said one rotational direction, and indexing means carried by said operator and arranged to engage in indexing portion of said holder to index the latter upon rotation of said operator oppositely to said one rotational direction.

5. In a device for dressing abrasive members, a tubular body, a diamond dressing tool holder shiftable within said body, said holder having portions engageable with portions of said body to lock said holder against rotation relative to said body upon axial shifting of said holder in one axial direction with respect to said body, said body having an externally threaded portion, an internally threaded annular operator screwed on said portion to shift in said one axial direction upon rotation in one rotational direction, said holder having a portion abutting a portion of said operator at the axial side of the latter portion facing in said one axial direction, thereby to be shifted in said one axial direction by said latter portion upon rotation of said operator in said one rotational direction, and indexing means carried by said operator and arranged to engage an indexing portion of said holder to index the latter upon roation of said operator oppositely to said one rotational direction.

6. In a device for dressing abrasive members, a tubular body, a diamond dressing tool holder shiftable within said body, said holder having portions engageable with portions of said body to lock said holder against rotation relative to said body upon axial shifting of said holder in one axial direction with respect to said body, said body having an externally threaded portion, an internally threaded annular operator screwed on said portion to shift in said one axial direction upon rotation in one rotational direction, said holder having a portion abutting a portion of said operator at the axial side of the latter portion facing in said one axial direction, thereby to be shifted in said one axial direction by said latter portion upon rotation of said operator in said one rotational direction, an annular ratchet member having a given number of teeth, a pawl member interengageable with said ratchet member, one of said members being rotatable with said holder and the other being rotatable with said operator, said pawl member at one rotational position being initially engageable with said ratchet member for indexing movement therewith in a direction oppositely to said one rotational direction, and movement limiting means engageable with a portion on said body to limit indexing movement of said holder to a predetermined arc, said arc being equal to the arc of said ratchet containing another given number of said teeth, one of said given numbers being an odd number and the other being an even number relatively prime to the odd number.

7. The combination as set forth in claim 5 wherein said indexing means and indexing portion comprise a pair of indexing members, one of said members comprising an annular ratchet having an odd number of teeth and the other of said members comprising a pawl interengaging said teeth.

8. In the method of utilizing a diamond dressing tool in the dressing of abrasive members, the steps of successively indexing different portions of the dressing surface of said tool in turn to a dressing position by successively rotating the tool through equal arcs of indexing movement comprising aliquant parts of a complete circle, and after each successive indexing of the tool dressing the abrasive members with the portion of the dressing surface of the tool at the dressing position until that portion is worn to a predetermined flat area subtending an arc approximately equal to the arc of the indexing movement.

9. The method as set forth in claim 8 wherein each arc of indexing movement comprises an odd number of units of arc of which an even number comprises a complete circle.

References Cited in the file of this patent

UNITED STATES PATENTS

| | | |
|---|---|---|
| 431,855 | Simpson | July 8, 1890 |
| 1,106,745 | Stevens | Aug. 11, 1914 |
| 1,400,614 | Lovejoy | Dec. 20, 1921 |
| 1,469,051 | Poitras | Sept. 25, 1923 |
| 2,333,939 | Kreimborg | Nov. 9, 1943 |
| 2,396,495 | Drake | Mar. 12, 1946 |
| 2,400,368 | Palmer | May 14, 1946 |
| 2,466,199 | Berthiez | Apr. 5, 1949 |
| 2,468,921 | Bruce | May 3, 1949 |
| 2,587,172 | Koebel | Feb. 26, 1952 |

FOREIGN PATENTS

| | | |
|---|---|---|
| 553,026 | Great Britain | May 5, 1943 |
| 556,675 | Great Britain | Oct. 15, 1943 |